(12) United States Patent
Johnson

(10) Patent No.: US 8,522,822 B2
(45) Date of Patent: Sep. 3, 2013

(54) HYDRO-MECHANICAL TRANSMISSION AND VALVE ASSEMBLY

(75) Inventor: Douglas R. Johnson, Waterloo, IA (US)

(73) Assignee: Deere & Company, Moline, IL (US)

(*) Notice: Subject to any disclaimer, the term of this patent is extended or adjusted under 35 U.S.C. 154(b) by 1058 days.

(21) Appl. No.: 12/538,912

(22) Filed: Aug. 11, 2009

(65) Prior Publication Data
US 2010/0287925 A1 Nov. 18, 2010

Related U.S. Application Data

(62) Division of application No. 11/488,260, filed on Jul. 18, 2006, now Pat. No. 7,588,510.

(51) Int. Cl.
*F16K 11/18* (2006.01)
*F16H 47/04* (2006.01)

(52) U.S. Cl.
USPC ............................. 137/636.2; 475/82

(58) Field of Classification Search
USPC ........ 251/14, 225, 251, 257, 259; 137/637.2, 137/637.3, 637.4, 637.5, 636.4, 495, 636.2; 475/82
See application file for complete search history.

(56) References Cited

U.S. PATENT DOCUMENTS

| | | | | | |
|---|---|---|---|---|---|
| 2,494,183 | A | * | 1/1950 | Lincoln | 251/58 |
| 2,700,985 | A | * | 2/1955 | Gleasman | 137/625.11 |
| 2,879,801 | A | * | 3/1959 | Cornelius | 137/636.2 |
| 3,602,243 | A | * | 8/1971 | Holt et al. | 417/405 |
| 3,823,801 | A | * | 7/1974 | Arnold | 192/48.618 |
| 4,024,775 | A | * | 5/1977 | Anderson et al. | 475/78 |
| 4,469,007 | A | * | 9/1984 | Melocik | 91/358 A |
| 4,545,402 | A | * | 10/1985 | Lyons | 137/495 |
| 7,588,510 | B2 | * | 9/2009 | Johnson | 475/82 |

* cited by examiner

*Primary Examiner* — John Rivell
*Assistant Examiner* — Daphne M Barry

(57) ABSTRACT

A hydro-mechanical transmission for an agriculture vehicle, such as a tractor. The transmission includes an input shaft, a hydrostatic unit driven by the input shaft, a mechanical transmission driven by the hydrostatic unit and/or the input shaft, and a valve assembly having a pressure control valve assembly to control an output speed of the hydrostatic unit. A mechanical shift control valve assembly is coupled with the mechanical transmission to selectively engage one of the gear sets of the mechanical transmission and adjust the hydrostatic unit speed.

4 Claims, 3 Drawing Sheets

HYDRO-MECHANICAL TRANSMISSION AND VALVE ASSEMBLY

CROSS-REFERENCE TO RELATED APPLICATION

This application is a division of applicant's application U.S. Ser. No. 11/488,260, filed 18 Jul. 2006 now U.S. Pat. No. 7,588,510 and titled HYDRO-MECHANICAL TRANSMISSION AND VALVE ASSEMBLY, which application is pending.

BACKGROUND

1. Field of the Invention

The invention relates generally to a hydro-mechanical transmission particularly suited for use in an agricultural tractor. More specifically, the invention relates to an infinitely-variable hydro-mechanical transmission and a valve assembly for controlling the hydro-mechanical transmission.

2. Related Technology

Hydro-mechanical transmissions are transmissions that combine a mechanical transmission with a hydrostatic unit. Mechanical transmissions generally have simple and reliable designs with relatively high performance efficiency (i.e. low power loss). However, purely mechanical transmissions are not infinitely variable and are thus restricted to particular speeds. In many applications, particularly agricultural tractors, it is desirable for the transmission of the vehicle to be infinitely adjustable. Hydrostatic transmissions typically are infinitely variable. However, hydrostatic transmissions are less efficient than mechanical transmissions.

In order to satisfy space limitations, reduce cost, increase efficiency and provide an infinitely variable speed, hydro-mechanical transmissions have been developed to combine the advantages of both types of transmissions. Hydro-mechanical transmissions are typically of a split power input type, where a hydrostatic unit and a mechanical transmission are both driven in parallel by the vehicle's engine. The hydrostatic output power is combined with the split mechanical power input from the engine to produce hydro-mechanical output power having a variable speed within each of a plurality of gear sets. More specifically, the mechanical transmission includes a plurality of gear sets that are selectively engaged and, within a given gear set, the hydrostatic output power is infinitely variable to vary the output speed.

The hydrostatic unit is a closed hydraulic system having a pump that converts rotational motion from the engine input shaft into fluid flow and a motor (hydraulically driven by the pump) that converts the fluid flow back into rotational motion that is delivered to the mechanical transmission. The pump is a variable-displacement pump so that the output speed of the motor is infinitely variable. More specifically, the variable-displacement pump includes an adjustable mechanism, such as a swash plate, that is controlled by a valve assembly. The valve assembly controls the angle of the swash plate to adjust the fluid flow within the hydrostatic unit thereby adjusting the hydrostatic output power.

Current hydrostatic units include microcontrollers and other electronic devices for controlling the angular position of the swash plate and to shift between gear ranges. However, these design features may increase the part cost, maintenance costs, and overall complexity of the hydrostatic unit. Furthermore, repair and maintenance of these hydrostatic units may require equipment, such as diagnostic machines, that is expensive and not readily available in some geographic areas.

Additionally, current hydrostatic units are controlled by several levers and controls, such as one or more controls for adjusting the operative gear set and one or more levers for controlling the speed and torque within the operative gear set. The multiple controls and levers may be difficult or inconvenient for use by the tractor operator.

It is therefore desirous to provide a hydro-mechanical transmission having a simple and reliable valve assembly for shifting between operative gear sets and for controlling output speed within each gear set and to provide simple and convenient controls for the operator of the vehicle.

SUMMARY

In overcoming the limitations and drawbacks of the prior art, the present invention provides a hydro-mechanical transmission including an input shaft, a hydrostatic unit driven by the input shaft, a mechanical transmission driven by the hydrostatic unit and/or the input shaft, and a valve assembly. The valve assembly includes a pressure control valve assembly to control the output speed of the hydrostatic unit and a shift control valve assembly coupled with the mechanical transmission for controlling first and second clutches and selectively engaging one of the gear sets of the mechanical transmission.

The hydro-mechanical transmission further includes a movable control lever coupled with the valve assembly such that the control lever, the shift control valve assembly, and at least one of the first and second clutches are connected with each other by physical working connections. The physical working connections include a mechanical connection between the control lever and the shift control valve assembly and a hydraulic connection between the shift control valve and the first and second clutches.

The hydro-mechanical transmission also preferably includes a reverse gear set selectively coupling the driven component with the output shaft when a reverse clutch is engaged.

In one aspect of the present invention, the hydro-mechanical transmission includes a valve assembly having first and second actuating valves for respectively engaging the first and second clutch, a shift control valve that is movable to actuate the first and second actuating valves and shift the operative gear set, and a pressure control valve assembly coupled with the hydrostatic unit to control an output speed of the hydrostatic unit.

In another aspect of the present invention, the hydro-mechanical transmission includes a shift control valve positioned within a shift cavity of the valve assembly housing and a pressure control valve assembly having a valve spool positioned coaxially with the shift control valve. The shift control valve is movable within the shift cavity to selectively engage one of the first and second gear sets and the pressure control valve assembly is coupled with the hydrostatic unit to control an output speed of the hydrostatic unit.

In yet another aspect of the present invention, a valve assembly for a hydro-mechanical transmission is provided. The valve assembly includes a first control valve movable to control first and second actuating valves and a second control valve movable to control the volume of a pressure control cavity. For example, the first control valve is able to translate within a valve support cavity and the second control valve is able to rotate within the valve support cavity.

The valve assembly preferably also includes a pressure control valve cooperating with a valve housing to define the volume of the pressure control cavity. The pressure control valve engages the second control valve such that rotation of the second control valve causes translation of the pressure control valve. More specifically, the second control valve preferably includes a base portion having a varying radius and engaging the pressure control valve so that rotation of the valve spool controls the position of the pressure control valve.

Further objects, features and advantages of this invention will become readily apparent to persons skilled in the art after a review of the following description, with reference to the drawings and claims that are appended to and form a part of this specification.

DETAILED DESCRIPTION

Figure 1:
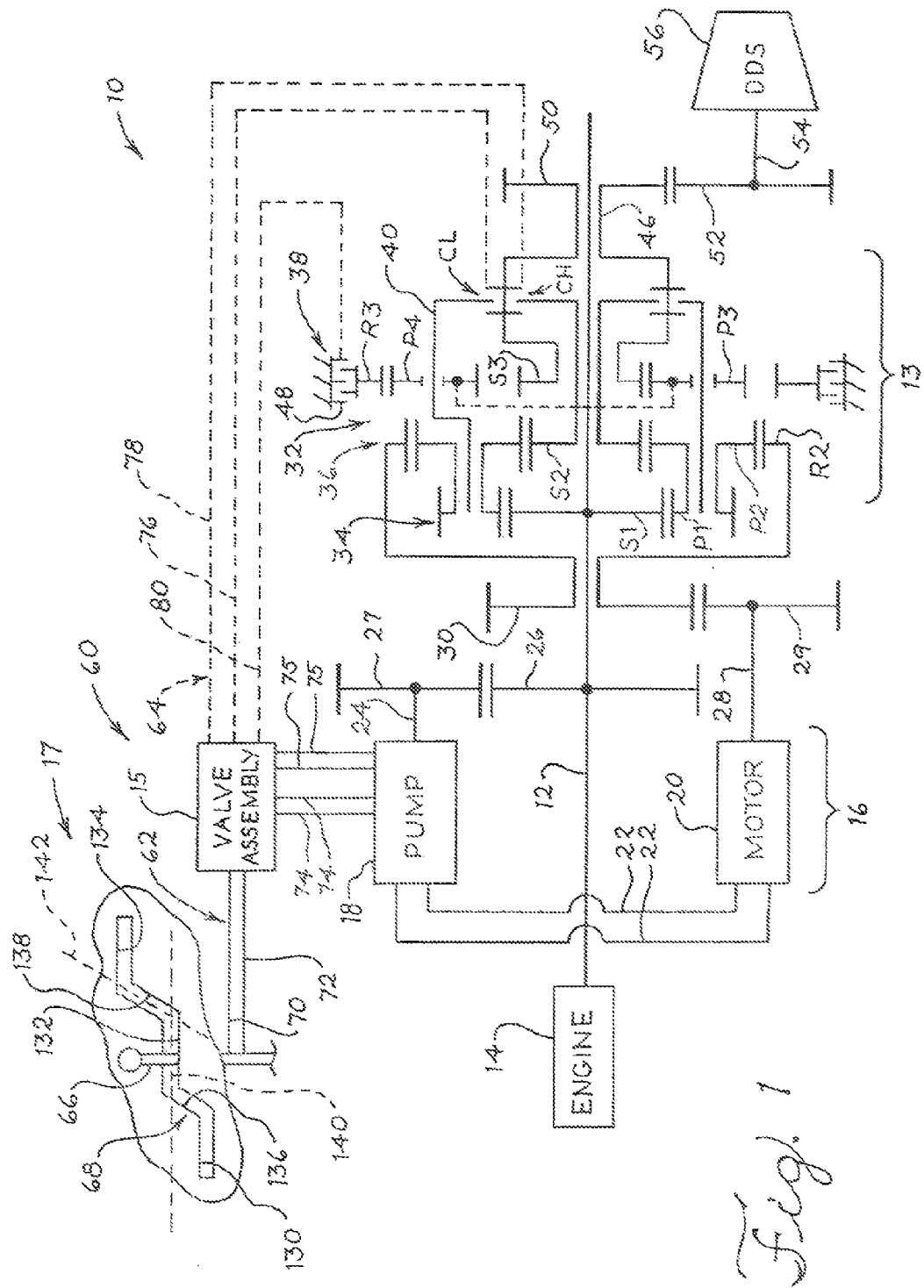
FIG. 1 is a schematic representation of a hydro-mechanical transmission embodying the principles of the present invention, having a hydrostatic unit, a valve assembly, and a mechanical transmission.

Referring now to the drawings, a hydro-mechanical transmission 10 for an agricultural vehicle, such as a tractor is schematically shown in FIG. 1. The hydro-mechanical transmission 10 generally includes an input shaft 12 driven by an engine 14, a hydrostatic unit 16 (having a pump 18 and a motor 20) driven by the input shaft 12, a mechanical transmission 13 driven by the input shaft 12 (via the engine 14) and the hydrostatic unit 16, a valve assembly 15 controlling the output speed of the hydrostatic unit 16 and the operative gear set of the mechanical transmission 13, and a control lever assembly 17 (accessible to the tractor operator) for controlling the valve assembly 15.

The hydrostatic unit 16 is a closed hydraulic system including a variable displacement pump 18 driven by the input shaft 12 and a fixed displacement motor 20 driving the mechanical transmission 13. More specifically, the pump 18 includes an input shaft 24 rotatably coupled with the engine input shaft 12 by a pair of gears 26, 27. The pump 18 converts the rotational motion of the input shaft 24 into fluid flow between the pump 18 and the motor 20 via hydraulic lines 22. The pump 18 is a variable-displacement pump having a variable coupling mechanism, such as a swash plate (not shown), that is controlled by the valve assembly 15. Accordingly, the valve assembly 15 controls the angle of the swash plate to adjust the fluid flow within the hydrostatic lines 22. The motor 20 is rotated by the fluid flow within the lines 22 so as to convert the fluid flow into rotational motion of a hydrostatic unit output shaft 28. Therefore, the angle of the swash plate controls the rotational speed of the hydrostatic unit output shaft 28. Those skilled in the art will recognize that either or both of the pump 18 and the motor 20 may be variable displacement components.

The hydrostatic unit output shaft 28 is coupled with the mechanical transmission 13 by a driving gear 29 connected to the output shaft 28 and a driven gear 30, as will be discussed in more detail below.

As seen above, the mechanical transmission 13 is driven by both a hydrostatic power input element and a mechanical power input element in parallel with each other. The mechanical power input element causes the output of the mechanical transmission 13 to rotate at a set "base" speed, which depends solely on the operative gear set, while the hydrostatic power input element adjusts the base speed via the hydrostatic unit 16. In this manner, the hydro-mechanical transmission 10 utilizes the efficient nature of the mechanical transmission 13 to achieve a base speed and utilizes the infinitely variable nature of the hydrostatic unit 13 to adjust the output speed as desired.

The mechanical transmission 13 includes a planetary system 32 having three planetary gear sets 34, 36, and 38. The planetary gear sets 34, 36, and 38 have a common planet gear carrier 40 that carries the integral planet gears P1 and P2 of planetary gear sets 34 and 36, respectively. The gear carrier 40 also carries the planet gears P3 and P4 of the reversing planetary gear set 38. The planet gears P1 and P2 are integrally formed and thus rotate together. The planet gears P2 mesh with a ring gear R2.

The ring gear R2 is formed integrally with the driven gear 30, in a position coaxial with the input shaft 12 of the engine 14. As mentioned above, the driven gear 30 is rotated by the driving gear 29 of the hydrostatic unit 16 so that the ring gear R2 serves as the hydrostatic power input element to the mechanical transmission 13.

The transmission input shaft 14 also directly drives a sun gear S1 of the first planetary gear set 34. Therefore, the sun gear S1 is the mechanical power input element to the mechanical transmission 13. The sun gear S1 meshes with the planet gear P1, that are integrally formed with planet gears P2 as mentioned above. The planet gears P2 mesh with a sun gear S2 and both are part of the planetary gear set 36.

Two clutches, a low range clutch CL and a high range clutch CH, selectively couple elements of the planetary system 32 to the mechanical transmission output shaft 46. The shaft 46 is a sleeve shaft that surrounds the input shaft 12, which extends through the entire mechanical transmission 13 to drive a power take off, not shown, and/or to drive other vehicle components, such as a hydraulic pump, in a known manner for an agricultural tractor. The low range clutch CL is engageable to couple the carrier 40 to the output shaft 46 for a low speed forward range. The high range clutch CH is engageable to couple the sun gear S2 to the output shaft 46 for a high speed forward range.

The output shaft 46 is fixed to a sun gear S3 of the reversing planetary gear set 38. Ring gear R3 is selectively grounded by a reverse clutch in the form of a reverse brake 48. This stops the rotation of the ring gear R3 and causes the sun gear S3 to rotate in the reverse direction for a reverse speed range. When the reverse brake 48 is applied, both the low and high range clutches CL and CH are disengaged, whereby the sun gear S3 drives the output shaft 46.

The output shaft 46 of the mechanical transmission is integrally formed with a gear 50 that in turn meshes with a gear 52 on the offset shaft 54. The offset shaft 54 is coupled to the differential drive shaft 56 of the tractor to couple the hydro-mechanical transmission 10 to a load.

The hydro-mechanical transmission 10 thus operates in three ranges, a reverse range, a low speed forward range and a high speed forward range. Each range uses a separate path through the mechanical transmission to the output shaft 46 resulting in unique gear ratios for each range.

The valve assembly 15 and the control lever assembly 17, shown in FIG. 1, cooperate to serve two main functions: first, selectively actuating the low range clutch CL, the high range clutch CH, and the reverse brake 48 to shift between operative gear sets; and, second, adjusting the variable-displacement pump 18 to control the hydrostatic power input element to mechanical transmission 13 and control the speed of the tractor.

The control lever assembly 17, the valve assembly 15, and each of the respective clutches CL, CH, and reverse brake 48 are connected with each other by physical working connections 60. As used herein, the term "physical working connections" refers to any type of connection between respective components that utilizes physical forces, such as a mechanical connection, a hydraulic connection, or a pneumatic connection. For example, the physical working connections 60 shown in the figures include a mechanical connection 62 between the control lever assembly 17 and the valve assembly 15 and a hydraulic connection 64 between the valve assembly and each of the respective clutches CL, CH, and the reverse brake 48.

The control lever assembly 17 includes a control lever 66 that is movable along a track 68 and that is accessible to the tractor operator. The control lever 66 extends downward below the exposed surfaces of the tractor and is mechanically connected to the valve assembly 17 by a shift linkage 70 and a pressure linkage 72, as will be discussed further below.

Generally, the valve assembly 15 is fluidly connected to the pump 18 by a pair of hydraulic lines 74 so as to define a closed hydraulic system for controlling the position of the swash plate and by another pair of hydraulic lines 75 so as to define a second closed hydraulic system for adjusting the operative gear set. Also, the valve assembly 15 is fluidly connected with each of the respective clutches CL, CH, and reverse brake 48 by a plurality of hydraulic paths 76, 78, 80. Although the hydraulic paths 76, 78, 80 are illustrated as being outside of the valve assembly in FIG. 1, the paths 76, 78, 80 are actually defined by the housing of the valve assembly, as will be discussed further below.

Figure 2:
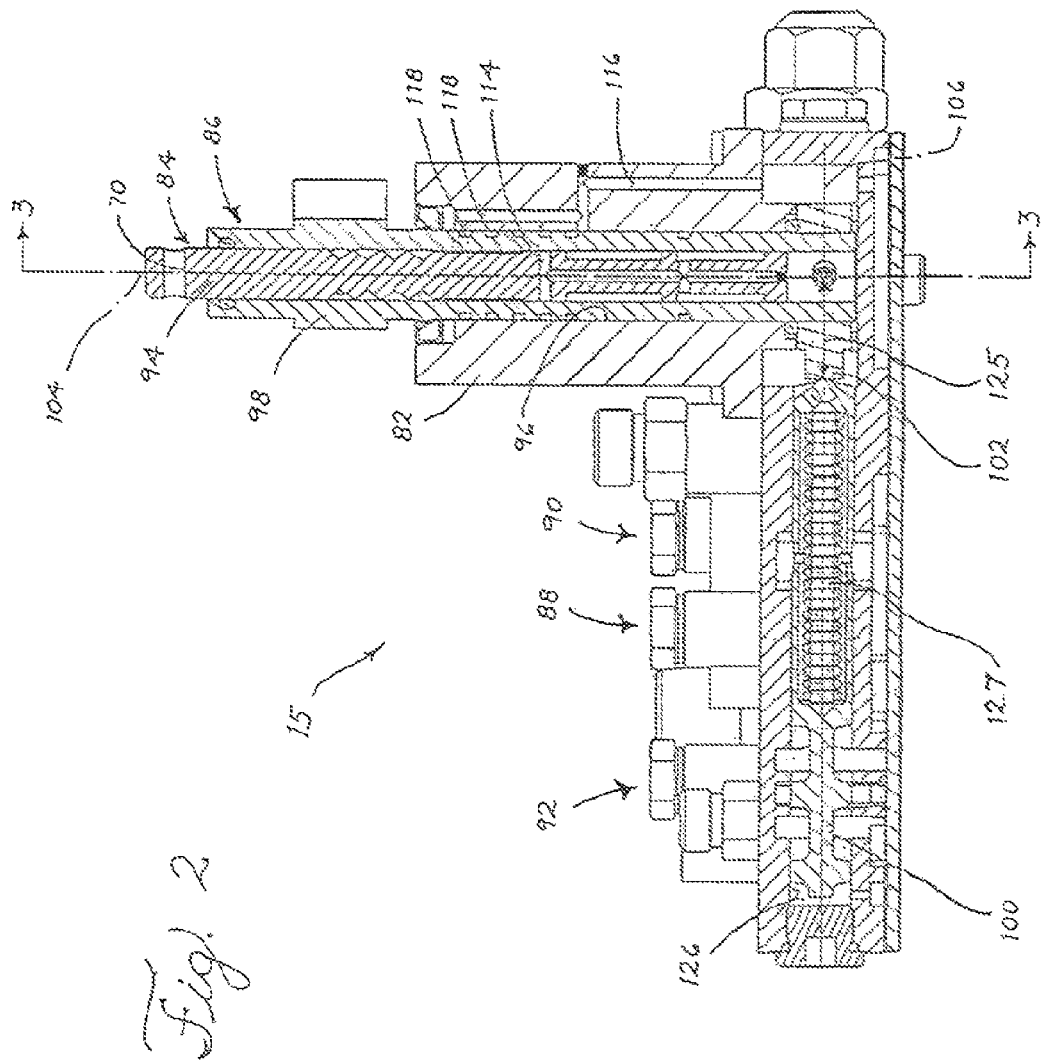
FIG. 2 is a cross-sectional view of the valve assembly employed in FIG. 1.

Referring to FIG. 2, the valve assembly 15 is shown in more detail. Particularly, the valve assembly 15 has a housing 82 supporting a shift control valve assembly 84 for shifting the operative gear set and a pressure control valve assembly 86 for controlling the hydrostatic power input element to mechanical transmission 13. The housing 82 also supports a low gear actuating valve 88 for engaging the low clutch CL, a high gear actuating valve 90 for engaging the high clutch CH, and a reverse gear actuating valve 92 for engaging the reverse brake 48. Moreover, the housing defines: the low hydraulic path 76, which extends between the shift control valve assembly 84 and the low gear actuating valve 88; the high hydraulic path 78, which extends between the shift control valve assembly 84 and the high gear actuating valve 90; and the reverse hydraulic path 80, which extends between the shift control valve assembly 84 and the reverse gear actuating valve 92. Although the respective paths 76, 78, 80 are not depicted in FIG. 2, the paths are defined by the pathways formed within the housing 82, each pathway having an appropriate size and shape for receiving a working fluid.

Generally, the shift control valve assembly 84 includes an inner valve 94 positioned within a shift cavity 96 of the housing 82. The pressure control valve assembly 86 includes an outer valve 98 coaxially positioned around the inner valve 94 within the shift cavity and a pressure control valve 100 engaging a base portion 102 of the outer valve 98 and extending generally perpendicularly away therefrom. Each of the valves 94, 98, 100 is movable within the housing 82. Namely, the inner valve 94 is movable with respect to the outer valve 98 along a central longitudinal axis 104 of the inner and outer valves 94, 98; the outer valve is rotatable about the longitudinal axis 104 within the shift cavity 96; and the pressure control valve 100 is movable with respect to the housing 82 along a transverse axis 106 that is generally perpendicular to longitudinal axis 104.

The inner valve 94 is mechanically connected to the control lever 66 (seen in FIG. 1 and shown in phantom in FIG. 3) by the shift linkage 70. The shift linkage 70 shown in the figures is a bore extending through a top portion of the inner valve 94 for receiving an engagement pin of the control lever 66, but any other appropriate connection may be used. For example, one or more connection arms and other linkages may be utilized to mechanically link the control lever 66 to the inner valve 94. The inner valve 94 is releasably secured in one of four positions by a pair of support pins 108 that extend through the outer valve 98 and engage a groove 110 formed in the surface of the inner valve 94. The support pins 108 are both biased inward towards the inner valve 94 by respective springs 112 so that the inner valve 94 is held in place within the outer valve 98, unless a sufficiently strong force acts on the inner valve 94 via the shift linkage 70.

Figure 3:
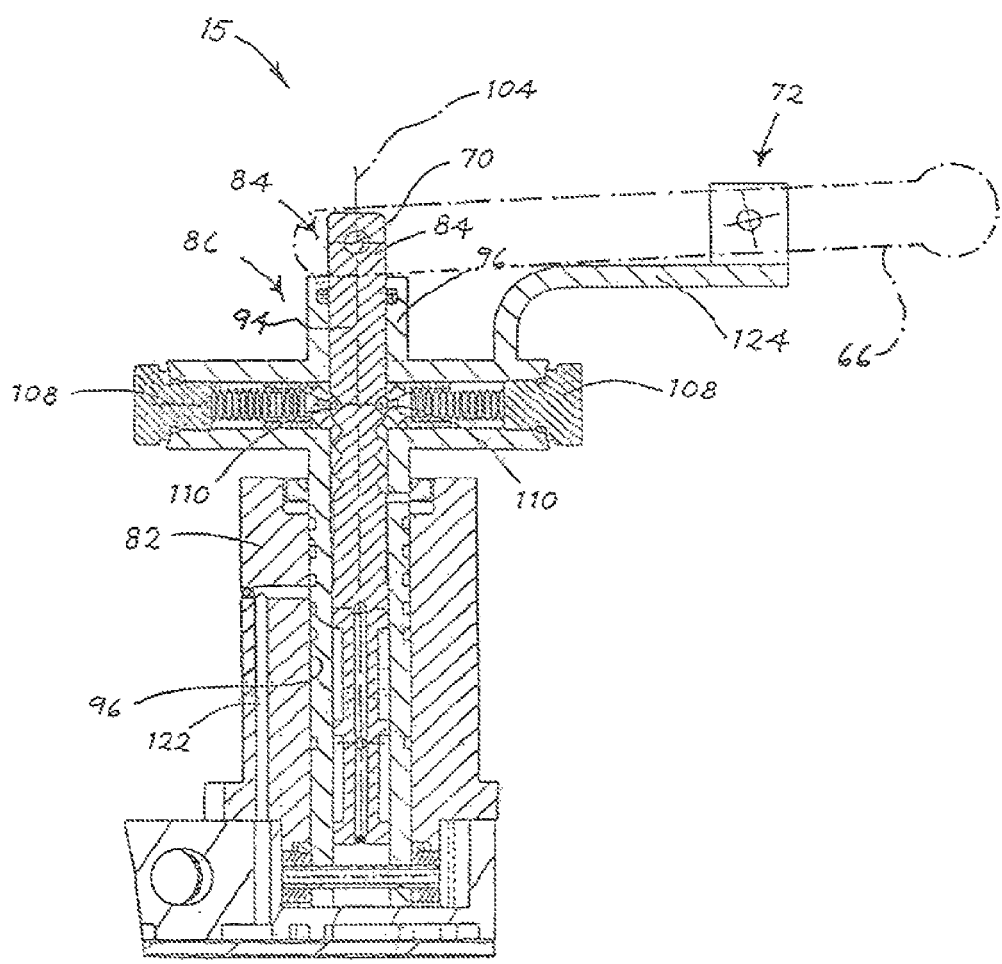
FIG. 3 is a cross-sectional view, generally taken along line 3-3, of the valve assembly seen in FIG. 2.

As mentioned above, the inner valve has four positions, each corresponding to an operative gear set 32, 34, 36. For example, the position shown in FIGS. 2 and 3 is a first position, where the support pins 108 are aligned with the top groove 110 and the inner valve 94 is in its lowermost position within the outer valve 98, such that the reverse gear set 38 is engaged. As the inner valve 94 is moved upwards into each of the remaining three positions, the mechanical transmission 13 will progressively engage the low gear set 34, the high gear set 36, and a neutral position where none of the gear sets 34, 36, 38 are engaged.

As mentioned above, the housing 82 defines a plurality of hydraulic paths 76, 78, 80 extending between the shift cavity 96 and the respective actuating valves 88, 90, 92. As the inner valve 94 moves between the four positions, each of the respective actuating valves 88, 90, 92 selectively fluidly connected with the shift cavity 96, thereby selectively actuating one of the valves 88, 90, 92 and engaging one of the clutches CL, CH, and reverse brake 48. More specifically, the inner valve 94 defines a bore 114 extending therethrough and the housing 82 defines a passageway 116 extending between the pump 18 and the shift cavity 96. Furthermore, the respective hydraulic paths 76, 78, 80 each connect to the shift cavity 96 at different positions along the vertical longitudinal axis 104 so that the bore 114 is only aligned with one of the respective hydraulic paths 76, 78, 80 at a time. The outer valve 98 also includes bores (not shown) extending through the outer valve wall and grooves 118 aligned with each of the bores and extending annularly around the outer valve 98 so that fluid can flow through the outer valve 98. The pump 18 is fluidly connected with the shift cavity 96 by hydraulic lines 75 so that the pump 18 and the shift control valve assembly 84 cooperate to define a closed hydraulic system.

During operation, as the inner valve 94 moves between the respective four positions, the respective hydraulic paths 76, 78, 80 will be selectively fluidly connected with the shift cavity 96 and the pump 18 via the bore 114 in the inner valve 94. The valve assembly 15 also includes a purge conduit 122 (FIG. 3) connected to the shift cavity 96 so that the working fluid is drained from a given hydraulic path and the respective actuating valve is disengaged when the inner valve 94 moves out of a particular position. Therefore, only one actuating valve 88, 90, 92 is actuated at a time.

As mentioned above, the pressure control valve assembly 86 includes the outer valve 98 coaxially positioned around the inner valve 94 and the pressure control valve 100 that engages the base portion 102 of the outer valve 98. The outer valve 98 is connected to the control lever 66 (seen in FIG. 1 and shown in phantom in FIG. 3) by the shift linkage 72. The shift linkage 72 shown in FIG. 3 is a radial arm 124 extending away from the outer valve 98 and includes a bore extending through a portion of the arm for receiving an engagement pin of the control lever 66. While specifically shown, any other appropriate connection may be used. For example, one or more connection arms and linkages may be utilized to mechanically link the control lever 66 to the outer valve 98.

The outer valve 98 is free to rotate within the housing 82 when a sufficiently strong rotational force is applied to the radial arm 124. As mentioned above, the base portion 102 of the outer valve 98 includes a varying radius 125. Therefore, as the outer valve 98 is rotated, the pressure control valve spring 127 is caused to compress or relax. The spring force is countered by the pressure in the pressure control cavity 126 of the pressure control valve 100. As the spring force is adjusted, the control pressure in the cavity 126 is adjusted and the working fluid flows towards or away from the pump 18 via the hydraulic lines 74, thereby adjusting the angular position of the swash plate in the pump 18 and adjusting the hydrostatic power input element acting on the mechanical transmission 13.

Referring back to FIG. 1, during operation of the tractor, the control lever 66 is movable along the track 68 to follow a generally step-shaped path. More specifically, the track 68 includes: a reverse portion 130 controlling the speed of the tractor when the reverse gear set 38 is engaged, a low gear portion 132 controlling the speed of the tractor when the low gear set 36 is engaged, a high gear portion 134 controlling the speed of the tractor when the high gear set 34 is engaged, a first shifting portion 136 for shifting between the reverse and the low gear sets, and a second shifting portion 138 for shifting between the low gear and the high gear sets. The reverse, low, and high gear portions 130, 132, 134 of the track 68 are each generally parallel with each other so that movement of the control lever 66 along a first axis 140 actuates the pressure linkage 72 and rotates the outer valve 98, thereby adjusting the hydrostatic power input element acting on the mechanical transmission 13. Similarly, the first and second shifting portions 136, 138 of the track are generally parallel with each other so that movement of the control lever 66 along a second axis 142 actuates the shift linkage 70 and vertically moves the inner valve 94, thereby shifting the operative gear set 34, 36, 38. Therefore, the operator is able to operate the tractor in a relatively simple, convenient manner.

It is therefore intended that the foregoing detailed description be regarded as illustrative rather than limiting, and that it be understood that it is the following claims, including all equivalents, that are intended to define the spirit and scope of this invention. For example, the hydrostatic pump and motor may be replaced with a variable speed friction drive that is controlled hydraulically.

What is claimed is:

1. A valve assembly for a hydro-mechanical transmission, the valve assembly comprising:
    a housing at least partially defining a valve support cavity, a first fluid path, and a second fluid path, and a pressure control cavity;
    first and second actuating valves supported by the housing;
    a first control valve movable within the valve support cavity between a first position, where the valve support cavity is fluidly connected with the first actuating valve, and a second position, where the valve support cavity is fluidly connected with the second actuating valve; and
    controller movable within the valve support cavity between a first position, where the pressure control cavity has a first volume, and a second position, where the pressure control cavity has a second volume.

2. A valve assembly as in claim 1, wherein the first control valve is able to translate within the valve support cavity between the first and second positions of the first control valve and wherein controller is able to rotate within the valve support cavity between the first and second positions of controller.

3. A valve assembly as in claim 2, further comprising a pressure control valve cooperating with the housing to define the pressure control cavity, wherein the pressure control valve is coupled with controller so that the rotation of controller controls the pressure of the pressure control valve.

4. A valve assembly as in claim 3, wherein controller includes a base portion defining a varying radius and engaging the pressure control valve so that rotation of controller controls the position of the pressure control valve.

\* \* \* \* \*